(12) United States Patent
Haschka et al.

(10) Patent No.: US 8,121,951 B2
(45) Date of Patent: Feb. 21, 2012

(54) CHECK CLEARING SYSTEMS

(76) Inventors: Joseph M. Haschka, Bloomington, MN (US); Kerry Jones, Phoenix, AZ (US)

(*) Notice: Subject to any disclaimer, the term of this patent is extended or adjusted under 35 U.S.C. 154(b) by 1500 days.

(21) Appl. No.: 11/350,524

(22) Filed: Feb. 8, 2006

(65) Prior Publication Data

US 2006/0184441 A1 Aug. 17, 2006

Related U.S. Application Data

(60) Provisional application No. 60/652,282, filed on Feb. 11, 2005.

(51) Int. Cl.
*G06Q 40/00* (2006.01)

(52) U.S. Cl. .................. 705/45; 705/35; 705/38; 705/39

(58) Field of Classification Search .................. 705/45, 705/35, 38, 39
See application file for complete search history.

(56) References Cited

U.S. PATENT DOCUMENTS

| | | | |
|---|---|---|---|
| 5,870,725 A * | 2/1999 | Bellinger et al. ............. | 705/45 |
| 5,940,844 A * | 8/1999 | Cahill et al. .................. | 715/268 |
| 6,609,200 B2 | 8/2003 | Anderson et al. | |
| 7,386,511 B2 * | 6/2008 | Buchanan et al. ............. | 705/45 |
| 2003/0208421 A1 * | 11/2003 | Vicknair et al. ............... | 705/35 |
| 2004/0133517 A1 * | 7/2004 | Zubizarreta .................... | 705/44 |
| 2004/0143394 A1 | 7/2004 | McIntyre et al. | |
| 2004/0143451 A1 | 7/2004 | McIntyre et al. | |
| 2005/0021466 A1 * | 1/2005 | Buchanan et al. ............. | 705/42 |
| 2005/0071283 A1 * | 3/2005 | Randle et al. .................. | 705/75 |
| 2005/0216409 A1 * | 9/2005 | McMonagle et al. .......... | 705/45 |

OTHER PUBLICATIONS

E-billing & customer service: Realizing the potential, Anonymous. Insurance & Technology. New York:Jul. 2000. vol. 25, Iss. 7, p. A20-A23 (4 pp.).*
Selecting a Web banking system, Rick Long. Credit Union Magazine. Madison:Feb. 2003. vol. 69, Iss. 2, p. 54 (1 pp.).*
UMB adds payment module to UNITEPlus, Anonymous. Bank News. Kansas City:Jul. 1999. vol. 99, Iss. 7, p. 35-36 (2 pp.).*
Will Wade. "Two Fiserv Deals, One Big Step Forward in Check Image Exchange." American Banker May 9, 2003,Accounting & Tax Periodicals, ProQuest. Web. Apr. 5, 2011.*

* cited by examiner

*Primary Examiner* — Shahid Merchant
(74) *Attorney, Agent, or Firm* — Stoneman Law Patent Group; Martin L. Stoneman; Eric Fish

(57) ABSTRACT

A system and process for more efficiently clearing checks by transmitting MICR line data together with a URL link to facilitate check clearing via electronic debits by an ACH. The URL link can be used at the option of the paying bank (or other entity) to access images of the check from a database.

27 Claims, 12 Drawing Sheets

CHECK CLEARING SYSTEMS

CROSS-REFERENCE TO RELATED APPLICATION

The present application is related to and claims priority from prior provisional application Ser. No. 60/652,282, filed Feb. 11, 2005, entitled "CHECK CLEARING SYSTEM, the contents of which are incorporated herein by this reference and are not admitted to be prior art with respect to the present invention by the mention in this cross-reference section.

BACKGROUND

This invention relates to providing an improved system which allows financial institutions such as banks to clear checks more efficiently. More particularly, it relates to providing a system which transmits brief electronic data rather than physical checks or check images to facilitate a check clearing process.

In the past, deposited checks have been cleared through processes involving the physical transfer or shipping of checks; and, more recently, as discussed below, transfer of check images. For example, in the past physical checks have been shipped from location to location (e.g., a bank in California to the Federal Reserve to a bank in Florida) for processing. Shipping physical checks can take significant time (e.g., days) and, considering that billions of checks are processed each year, the costs of shipping physical checks can add up significantly.

Transmitting electronic data rather than physical checks can significantly improve the efficiency of clearing checks by lowering transaction costs and increasing the speed of processing (since electronic data can be sent from location to location for processing virtually instantly). Given the volume of transactions involved in the United States and throughout the world, it would be advantageous to have a process and system as efficient as possible, which process minimizes exchange expenses, float expenses, and transportation expenses. Further, for systems involving the electronic transfer of data, it would be advantageous to have a process that minimizes bandwidth and electronic transmission costs. Even further, it would be beneficial to have a standardized process, system and data exchange format for all financial institutions.

Routing check images electronically through a check clearing process (as in Check 21 systems) along traditional routes, although an improvement over transfer of physical checks, is still not an ideal solution. Check images require significant transmission bandwidth to transmit images at each step of the clearing process (relative to the bandwidth required, for example, to transmit MICR line data as preferred herein). And it also requires significant computer memory to store the check images at each step of the clearing process (relative to the memory required for MICR line data). Further, there are problems with image exchange standards resulting in inter-operability problems between banks and other involved entities.

OBJECTS AND FEATURES OF THE INVENTION

A primary object and feature of the present invention is to provide a system for more efficiently clearing checks.

It is a further object and feature of the present invention to provide such a system which reduces bandwidth and electronic transmission costs.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a banking system, relating to efficiently processing a plurality of checks issued by an assortment of banking customers, comprising the steps of: preserving, as at least one part of at least one information network accessible by computer use, at least one image of each at least one check of such plurality of checks; providing banking information associated with each such at least one check in at least one form of at least one electronic debit usable for banking purposes independently of such at least one image or such at least one check; associating with such at least one electronic debit at least one reference location information sufficient to locate and retrieve from such at least one information network at least one copy of such at least one image; and processing such at least one electronic debit in such banking system to clear such at least one check, without substantial further processing of such at least one image or such at least one check and such associated at least one reference location information. Moreover, it provides such a banking system wherein such banking information comprises MICR line information. Additionally, it provides such a banking system wherein such at least one reference location information is appended to such MICR line information. Also, it provides such a banking system wherein such at least one reference location information comprises at least one URL. In addition, it provides such a banking system wherein such at least one reference location information comprises hyperlink information. And, it provides such a banking system wherein such hyperlink information comprises at least one URL. Further, it provides such a banking system wherein such at least one information network comprises the Internet. Even further, it provides such a banking system wherein such at least one information network comprises at least one intranet. Moreover, it provides such a banking system wherein such at least one intranet comprises a banking-system intranet. Additionally, it provides such a banking system further comprising the steps of: rendering at least one bank statement to such at least one banking customer; wherein such at least one bank statement is associated with such at least one reference locator. Also, it provides such a banking system further comprising the steps of: rendering at least one bank statement to such at least one banking customer; wherein such at least one bank statement is associated with such at least one reference locator.

In accordance with another preferred embodiment hereof, this invention provides a business method for a banking system, relating to such banking system providing efficient processing of a plurality of bank-deposited checks issued by an assortment of banking customers, comprising the steps of: providing for collection of such plurality of bank-deposited checks; providing for preserving, as at least one part of at least one information network accessible by computer use, at least one image of each at least one check of such plurality of bank-deposited checks; providing for preserving banking information associated with each such at least one bank-deposited check in at least one form of at least one electronic debit usable for banking purposes independently of such at least one image or such at least one bank-deposited check; providing for associating with such at least one electronic debit at least one reference location information sufficient to locate and retrieve from such at least one information network at least one copy of such at least one image; and providing, as the primary regular transmission among agreeing parties of such banking system in processing for clearing such plurality of bank-deposited checks, for use, in connection with each such bank-deposited check, without such substantial further processing of such at least one image or such at least one check, of such at least one electronic debit including such at least one associated reference location information. In addition, it provides such a business method wherein such banking information comprises MICR line information. And, it provides such a business method wherein such at least one reference location information is appended to such MICR line information. Further, it provides such a business method wherein such at least one reference location information comprises at least one URL. Even further, it provides such a business method wherein such at least one reference location information comprises hyperlink information. Moreover, it provides such a banking system wherein such hyperlink information comprises at least one URL. Additionally, it provides such a business method wherein such at least one information network comprises the Internet. Also, it provides such a business method wherein such at least one information network comprises at least one intranet. In addition, it provides such a business method wherein such at least one intranet comprises a banking-system intranet. And, it provides such a business method further comprising the steps of: rendering at least one bank statement to such at least one banking customer; wherein such at least one bank statement is associated with such at least one reference locator. Further, it provides such a business method further comprising the steps of: rendering at least one bank statement to such at least one banking customer; wherein such at least one bank statement is associated with such at least one reference locator.

In accordance with another preferred embodiment hereof, this invention provides a computer program for a banking system, relating to efficiently processing a plurality of checks issued by an assortment of banking customers, comprising, in combination, the steps of: assisting to preserve, as at least one part of at least one information network accessible by computer use, at least one image of each at least one check of such plurality of checks; assisting to provide banking information associated with each such at least one check in at least one form of at least one electronic debit usable for banking purposes independently of such at least one image or such at least one check; assisting to associate with such at least one electronic debit at least one reference location information sufficient to locate and retrieve from such at least one information network at least one copy of such at least one image; and assisting to process in such banking system to clear such at least one check, without processing such at least one image or such at least one check, such at least one electronic debit and such associated at least one reference location information. Even further, it provides such a computer program wherein computer program steps relating to creating such at least one electronic debit and preparing such at least one electronic debit relating to batch transmission comprise: driving at least one scanning device to capture at least one MICR line from such at least one check, at least one image of at least one front of such at least one check; and at least one image of at least one back of such at least one check; creating at least one such electronic debit from data from such at least one MICR line, such at least one electronic debit incorporating information pertaining to at least one depositor of such at least one check; and such at least one reference location information; storing such at least one image so that such at least one reference location information is sufficient to locate and retrieve from such at least one information network such at least one copy of such at least one image; and gathering such at least one electronic debits into batches relating to such processing to do such clearing. Even further, it provides such a computer program wherein computer program steps relating to receiving and processing such at least one electronic debit comprise: directing such batches of such at least one electronic debits to at least one banking system existing programs parsing MICR lines and routing transactions to at least one of posting applications archival systems general ledger positive pay ARP systems; assisting to associate any at least one first newly-assigned reference number to at least one original reference number received with the at least one electronic debit; assisting to associate any at least one second newly-assigned reference number with such at least one reference location information. Even further, it provides such a computer program wherein computer program steps relating to securing the viewing of such at least one check image comprise: receiving at least one request for at least one image of such at least one check from at least one source authorized by such banking system; relating at least one request reference number to such at least one reference location information; providing at least one image archive source with at least one security information; retrieving such at least one image through web connection using such at least one reference location information; and presenting such at least one image in response to such at least one request. Computer means for a banking system, relating to efficiently processing a plurality of checks issued by an assortment of banking customers, comprising, in combination: computer processing means for assisting to preserve, as at least one part of at least one information network accessible by computer use, at least one image of each at least one check of such plurality of checks; computer processing means for assisting to provide banking information associated with each such at least one check in at least one form of at least one electronic debit usable for banking purposes independently of such at least one image or such at least one check; computer processing means for assisting to associate with such at least one electronic debit at least one reference location information sufficient to locate and retrieve from such at least one information network at least one copy of such at least one image; and computer processing means for assisting to process in such banking system to clear such at least one check, without processing such at least one image or such at least one check, such at least one electronic debit and such associated at least one reference location information. Computer means for a banking system, relating to efficiently processing plurality of checks issued by an assortment of banking customers, comprising, in combination: at least one computer processor adapted to assist to preserve, as at least one part of at least one information network accessible by computer use, at least one image of each at least one check of such plurality of checks; at least one computer processor adapted to assist to provide banking information associated with each such at least one check in at least one form of at least one electronic debit usable for banking purposes independently of such at least one image or such at least one check; at least one computer processor adapted to assist to associate with such at least one electronic debit at least one reference location information sufficient to locate and retrieve from such at least one information network at least one copy of such at least one image; and at least one computer processor adapted to assist to process in such banking system to clear such at least one check, without processing such at least one image or such at least one check, such at least one electronic debit and such associated at least one reference location information.

Figure 1:
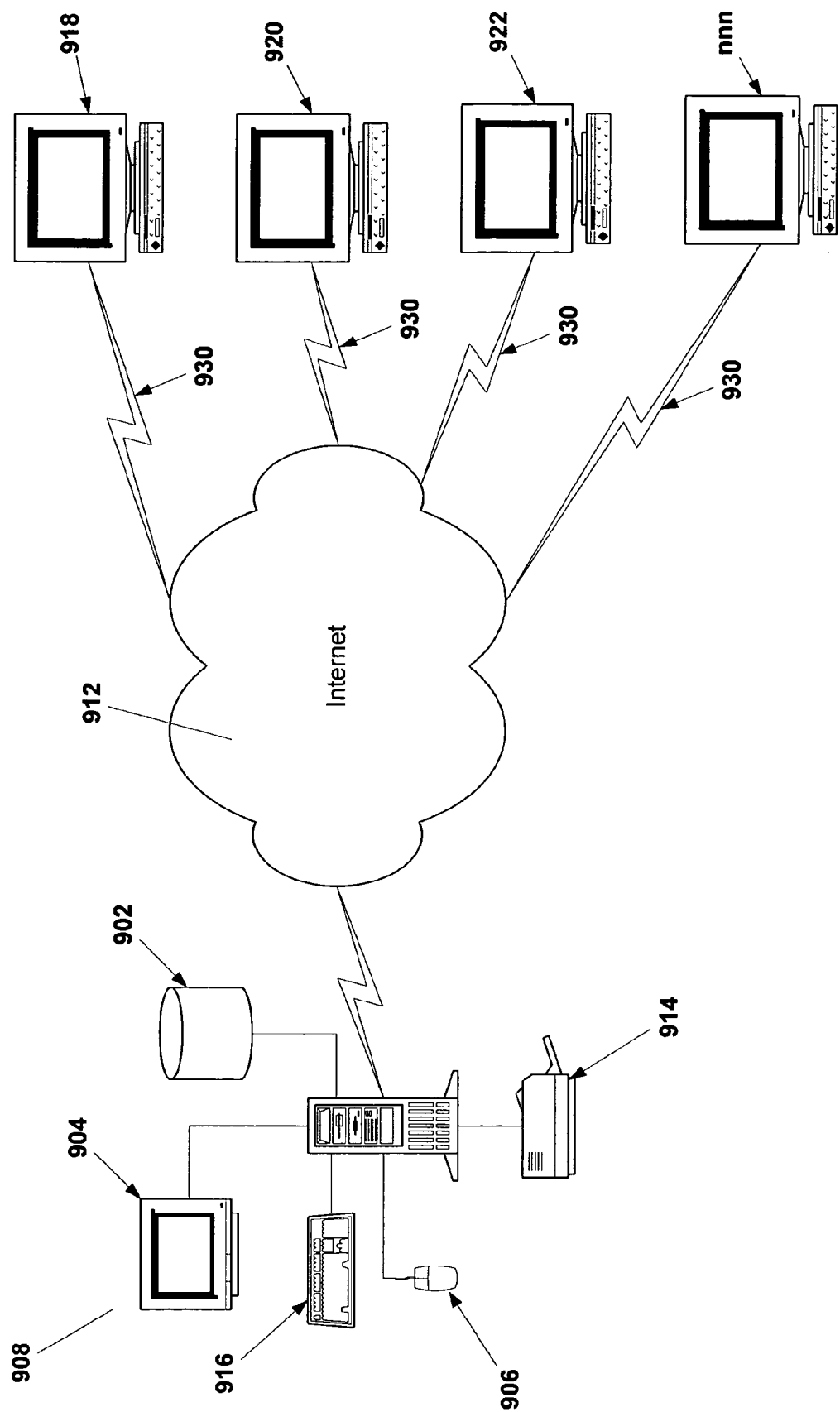
FIG. 1 shows a diagrammatical overview of the Internet communications used in the instant system according to a preferred embodiment of the present invention.

DETAILED DESCRIPTION OF THE BEST MODES AND PREFERRED EMBODIMENTS OF THE INVENTION

Glossary of General Terms and Acronyms

When reading the specification, the following information may assist in understanding terms and acronyms:

ACH—an acronym for Automated Clearing House—a nationwide batch-oriented electronic funds transfer system governed by the NACHA Operating Rules which provides for inter-bank clearing of electronic payments for participating depository financial institutions.

ANSI—an acronym for American National Standards Institute.

ARP—Account Reconciliation Package.

Bank—any entity engaged in the business of banking, including any depository institution; and including: Federal Reserve Banks; Federal Home Loan Banks; and the following entities when acting as payor: the Treasury of the United States; the United States Postal Service; State governments; and local government entities.

Check Conversion—the process by which information contained on an original physical check is captured electronically (data and image); including the routing and transit number, customer account number, check serial number, and amount of the check.

Check—a draft drawn on or payable through or at a bank, payable on demand, whether or not negotiable, that is handled for forward collection or return, including a substitute check and a travelers check.

Client-Server—a model of interaction in a distributed system in which a program at one site sends a request to a program at another site and waits for a response. The requesting program is called the "client," and the program that responds to the request is called the "server." In the context of the World Wide Web, the client is typically a "Web browser" that runs on a user's computer; the program that responds to Web browser requests at a Web site is commonly referred to as a "Web server."

Domain Name System (DNS)—an Internet service that translates domain names (which are alphabetic identifiers) into IP addresses (which are numeric identifiers for machines on a TCP/IP network).

File Transport Protocol (FTP)—the protocol used on the Internet for exchanging files. FTP is most commonly used to download a file from a server using the Internet or to upload a file to a server (e.g., uploading a Web page file to a server)

Hypertext Transport Protocol (HTTP)—the standard World Wide Web client-server protocol used for the exchange of information (such as HTML documents and client requests for such documents) between a Web browser and a Web server. HTTP includes a number of different types of messages that can be sent from the client to the server to request different types of server actions. For example, a "GET" message, which has the format GET, causes the server to return the document or file located at the specified Universal Resource Locator (URL).

HTTPS—HTTP over SSL (Secure Sockets Layer) can be best understood as a secure form of HTTP communication. Specifically, SSL is a protocol utilized for the authentication and encryption of HTTP traffic. In operation, the server and client exchange a set of encryption keys that are used to create a unique encryption key used to encrypt all data exchanged during the session.

Internet—a collection of interconnected (public and/or private) networks that are linked together by a set of standard protocols to form a distributed network. While this term is intended to refer to what is now commonly known as the Internet, it is also intended to encompass variations that may be made in the future, including changes and additions to existing standard protocols.

IRD—Image Replacement Document—a machine-readable substitute document created from the electronic check image of the front and back of the original physical check LAN—a Local Area Network of computer systems, typically within a building or office, permitting networking, the associated sharing of resources and files, such as application software, printers and client information, in an inter-office setting.

MICR line data—an acronym for Magnetic Ink Character Recognition line—the numbers printed near the bottom of a check in magnetic ink according to accepted ANSI and/or industry standards, which can include the bank routing number, account number, check number, check amount, and other data.

MICR-Link data—refers herein to MICR line data plus link data sufficient to assist locating the check image for web retrieval.

NACHA—an acronym for National Automated Clearing House Association

Paying Bank—the bank by which a check is payable, unless the check is payable at or through another bank and is sent to the other bank for payment or collection; or the bank at or through which a check is payable and to which the check is sent for payment or collection.

Reconverting Bank—a bank that creates a substitute check; or the first bank that transfers or presents a substitute check if such substitute check is created by an entity other than a bank.

SEC code—an acronym for Standard Entry Class code

Substitute Check—a paper reproduction (conforming to accepted industry standards) of an original physical check that comprises a MICR line with all the data from the MICR line of the original physical check, and comprises a check image of the front and back of the original physical check.

Transmission Control Protocol/Internet Protocol (TCP/IP)—a standard Internet protocol (or set of protocols) which specifies how two computers exchange data over the Internet. TCP/IP handles issues such as packetization, packet addressing, and handshaking and error correction. For more information on TCP/IP, see Volumes I, II and III of Corner and Stevens, Internetworking with TCP/IP, Prentice Hall, Inc., ISBNs 0-13-468505-9 (vol. I), 0-13-125527-4 (vol. II), and 0-13-474222-2 (vol. III).

Truncate—sending a substitute check (or check image with MICR line data) instead of an original physical check in a check collection or return process.

URL—an acronym for Uniform Resource Locater—an electronic address (such as for use on a computer network) which indicates what protocol to use, and specifies an IP address or domain name where a specified resource is located (e.g. http://www.patentdoc.com).

WAN—a Wide Area Network, such as the Internet.

Figure 2:
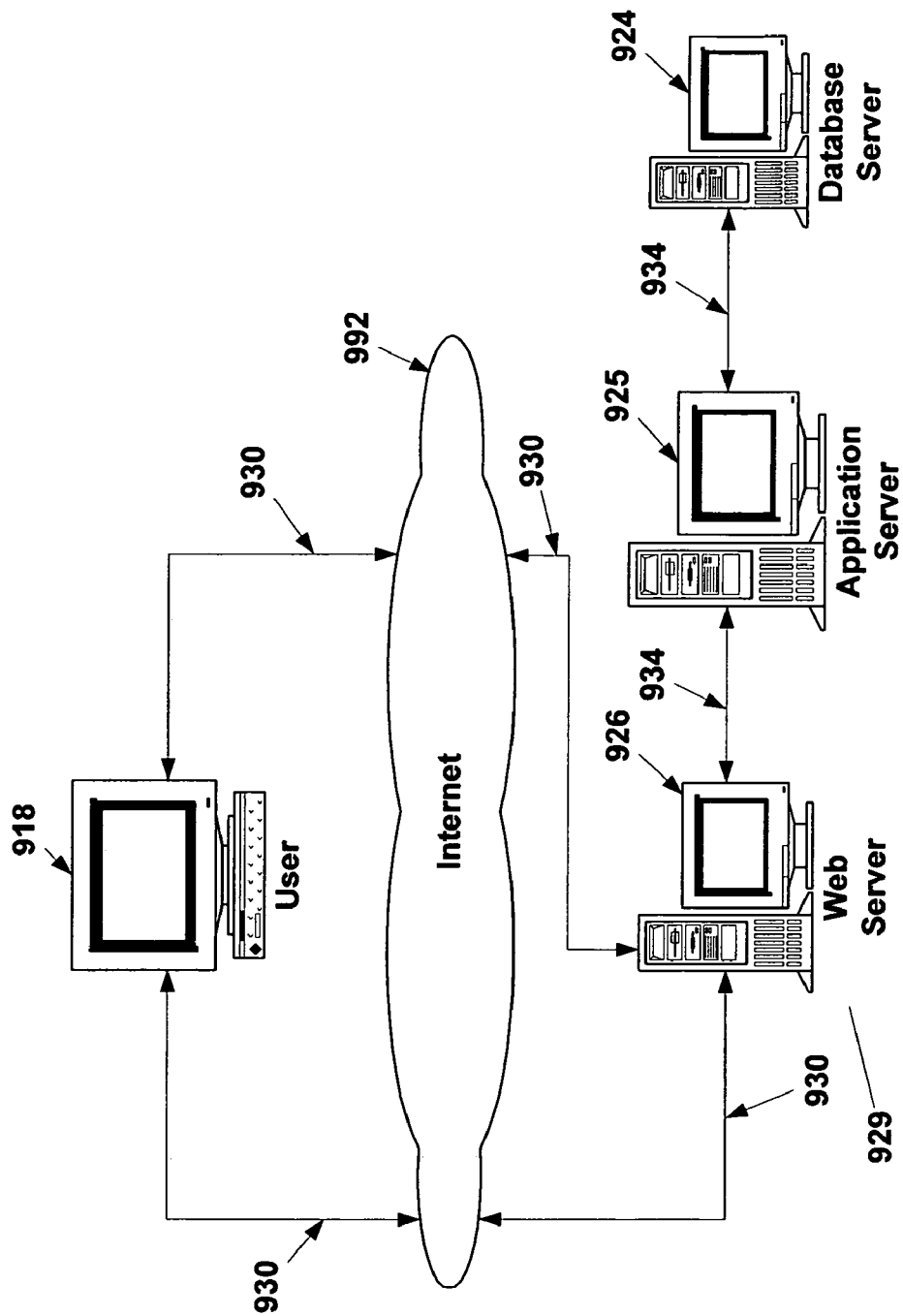
FIG. 2 shows a simplified functional diagrammatical overview of the relationship among the web site servers and users of the instant system according to a preferred embodiment of the present invention.

Referring now to FIGS. 1 and 2, a diagrammatical overview of the Internet communications used in the instant system according to a preferred embodiment of the present invention is shown. The present invention preferably comprises a computer system server 908. The computer system server 908 comprises input and output devices of the sort well known in the art. For example, the computer system server 908 preferably comprises a display screen or monitor 904, a keyboard 916, a printer 914, a mouse 906, etc. The computer system server 908 further preferably comprises a database 902 for storage of the data and software comprising preferred embodiments of the present invention. The computer system server 908 is preferably connected to the Internet 912 that serves as the presently preferred communications medium using http 930 (hypertext transport protocol) as preferred protocol for the exchange of information (such as HTML documents and client requests for such documents) between a Web browser and a Web server. The Internet 912, as previously discussed, comprises a global network of networks and computers, public and private. The Internet 912, which utilizes TCP/IP (Transmission Control Protocol/Internet Protocol) to manage the connections between devices, is the preferable connection method by the users 918, 920, 922 and nnn in preferred embodiments of the present invention.

Referring to FIG. 2, a simplified functional diagrammatical overview of the relationship among the web site servers and users of the instant system according to a preferred embodiment of the present invention is shown. This figure shows the preferred relationships between a user 918 (as an example of any number of users 918, 920, 922, nnn), the Internet 912, the web server 926, the application server 925 and the database server 924. Upon reading the teachings of this specification, those with ordinary skill in the art will now understand that, under appropriate circumstances, considering such issues user requirements and changes in technology, the web server 926, the application server 925 and the database server 924 may be combined into a single machine combined web server 929. As shown, a user 918 may request a page from the web site of the present invention operating on the combined web server 929. The user 918 is preferably connected via the Internet 912, and the web page request preferably initiates a call to the present invention using http 930. The present invention then preferably makes at least one request to the database server 924 and preferably generates an HTML page for transmission to the user 918 following the database server's completion of the present invention's request and transmission of the requested data back to the web server 926. The web server 926 preferably transmits the completed HTML frame page containing the data requested by the user 918 through the Internet 912 to the user 918. Upon reading the teachings of this specification, those with ordinary skill in the art will now understand that, under appropriate circumstances, considering such issues as user requirements and changes in technology, the above described database server 924, the web server 926 and the application server 925 may be combined and the above described interactions may be accomplished within the combined web server 929. Upon reading the teachings of this specification, those with ordinary skill in the art will now understand that, under appropriate circumstances, considering such issues as user requirements and changes in technology, the web server 926, the application server 925 and the database server 924 may communicate via an Ethernet-based local area network 934 or similar means.

Figure 3:
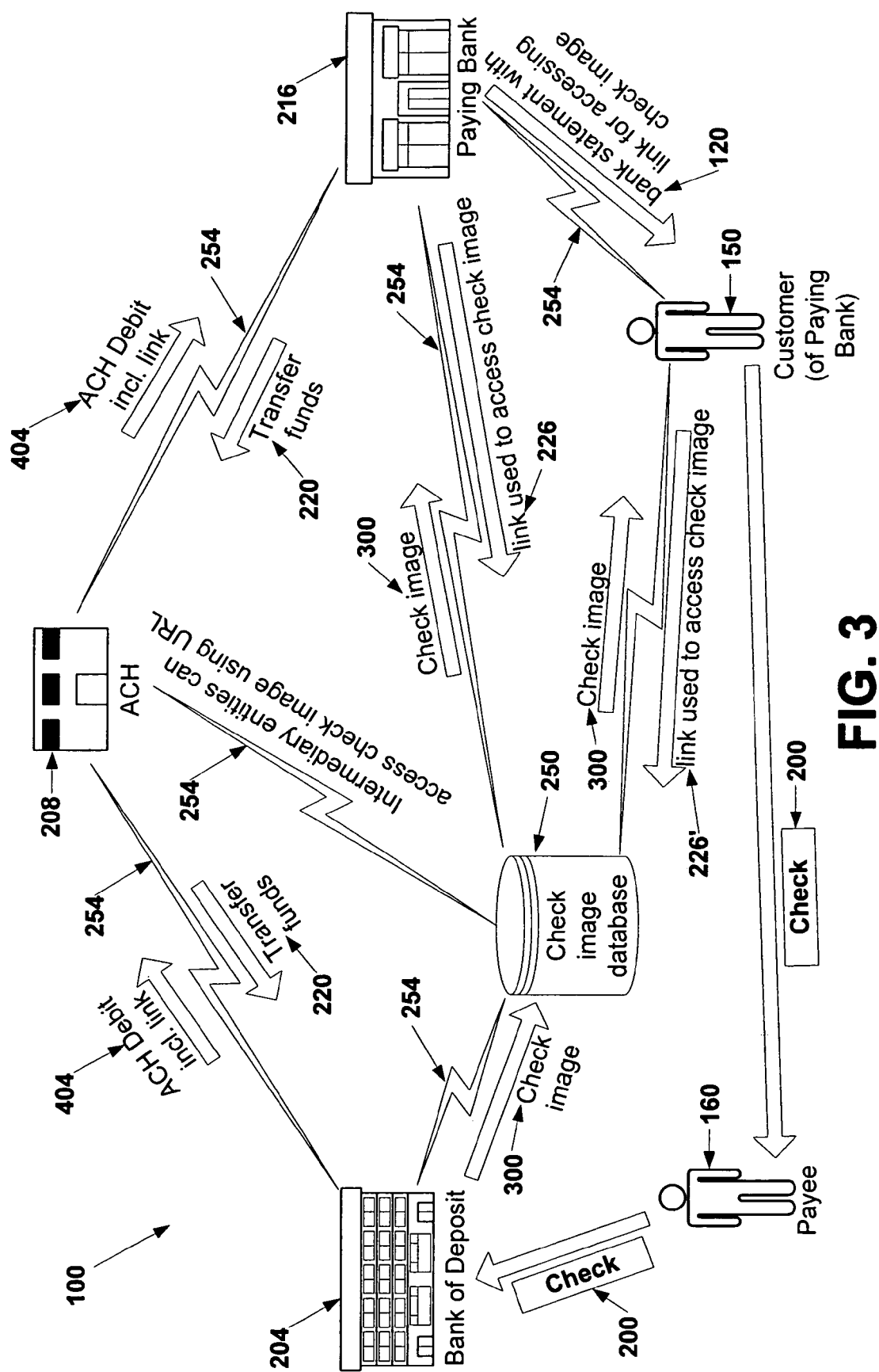
FIG. 3 shows a simplified functional diagram of a preferred embodiment of the present invention, showing the use of ACH debits with link data attached to clear checks through an ACH.
Figure 4:
FIG. 4 shows a flow diagram of steps involved in a check clearing process according to a preferred embodiment of the present invention.
Figure 5:
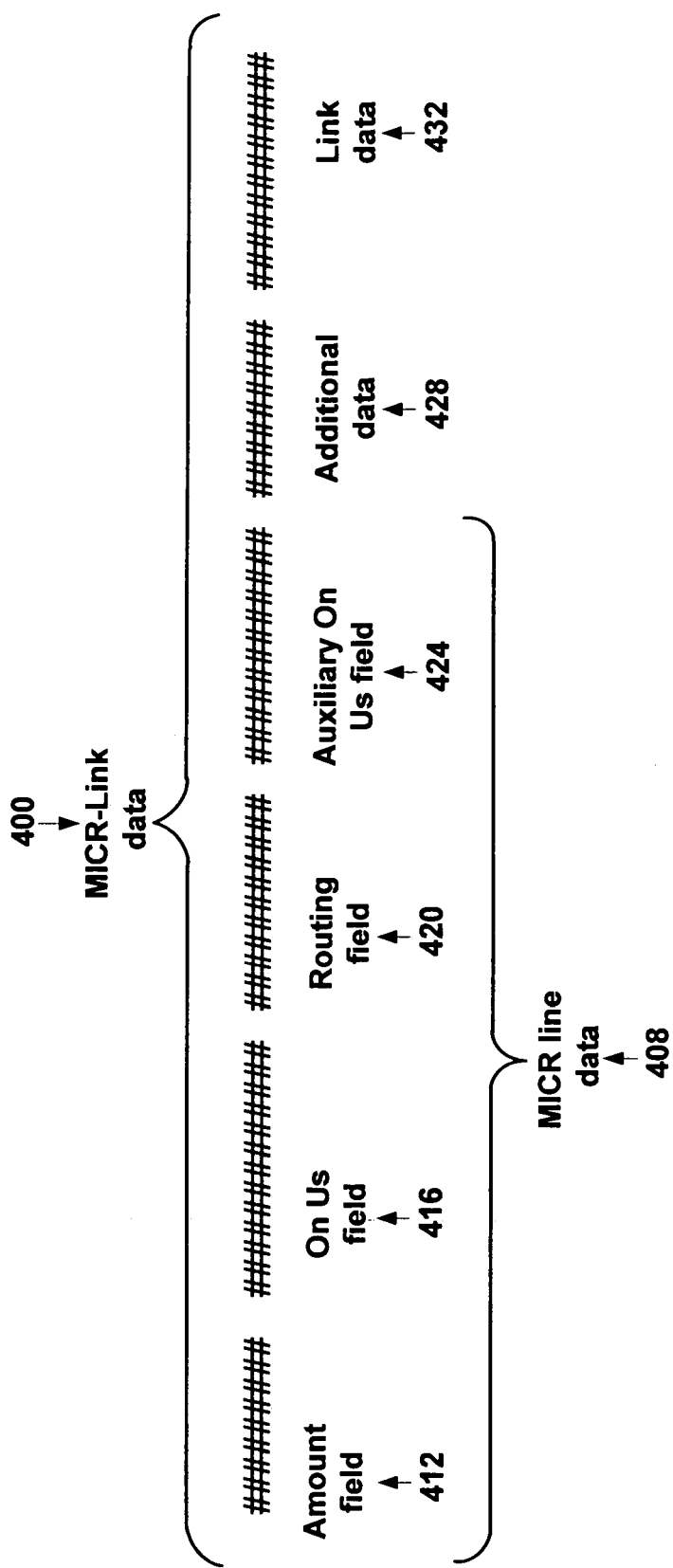
FIG. 5 shows a simplified diagrammatic representation of a MICR-Link data (see Glossary following) format according to a preferred embodiment of the present invention.

Reference is now made to FIG. 3, FIG. 4, and FIG. 5. FIG. 3 shows the use of ACH debits 404 with link data 432 to clear checks 200 through an ACH 208. FIG. 4 shows a flow diagram of steps involved in a check clearing process 100 according to a preferred embodiment of the present invention. FIG. 5 shows a simplified diagrammatic representation of MICR-Link data 400 formatted according to a preferred embodiment of the present invention.

Preferably, as shown in check clearing process 100, customer 150 writes check 200 drawn against an account at paying bank 216. Preferably, customer 150 presents check 200 to payee 160, as shown. Preferably, payee 160 deposits check 200 in bank of deposit 204. Preferably, check 200 is deposited at bank of deposit 204, as indicated by step 500. Preferably, check 200 comprises MICR line data 408, according to accepted industry standards. Preferably, bank of deposit 204 performs a process of check conversion by scanning check 200 to obtain MICR line data 408, and check image 300, as indicated by step 502.

As best shown in FIG. 5, preferably, MICR line data 408 comprises Amount field 412, On Us field 416, Routing field 420, and Auxiliary On Us field 424. Preferably, MICR line data 408 (at least embodying banking information associated with each such at least one check in at least one form of at least one electronic debit usable for banking purposes independently of such at least one image or such at least one check) is supplemented if necessary with any missing data or corrections (such as, for example, if the check amount was not able to be scanned or there were errors in the scanning process, etc.) and supplemented with additional data 428 if necessary to facilitate the clearing process, as indicated by step 504. Preferably, check image 300 comprises a check image of the front and back according to accepted industry standards. Preferably, check image 300 is stored electronically in database 250, which is accessible via electronic data exchange 254, as indicated by step 506 (at least embodying herein preserving, as at least one part of at least one information network accessible by computer use, at least one image of each at least one check of such plurality of checks).

Upon reading the teachings of this specification, those with ordinary skill in the art will now understand that, under appropriate circumstances, considering such issues as banking laws and regulations, bank preference, service agreements, etc., other database arrangements, such as storing additional data in the database, such as for example, MICR line data, etc., may suffice.

Preferably, link data 432 is created which allows access and retrieval of check image 300 from database 250, as indicated by step 508 (at least embodying herein associating with such at least one electronic debit at least one reference location information sufficient to locate and retrieve from such at least one information network at least one copy of such at least one image). Preferably, link data 432 is unique for each check image 300. Preferably, link data 432 comprises at least a portion which can be translated into link 226. Preferably, link 226 comprises a URL, preferably a computer hyperlink. Preferably, link 226 provides unique URL for each unique check image 300. Preferably, link 226 is encrypted to provide secure access to check image 300 in database 250. Preferably, access to database 250 utilizes encryption that, at a minimum, is equivalent to 128-bit RC4 encryption technology, or access to database 250 is accomplished via a secure session utilizing security technology that provides a level of security that, at a minimum, is equivalent to 128-bit RC4 encryption technology. Preferably, link 226 is formatted to minimize electronic memory required for storage and transmission of link data 432. Preferably, link data 432 is added to MICR line data 408 to create MICR-Link data 400. Preferably, MICR-Link data 400 is formatted according to an SEC code adopted and accepted as an industry standard by NACHA. Preferably, SEC code includes all MICR line data 408 required to create a substitute check and link data 432.

Upon reading the teachings of this specification, those with ordinary skill in the art will now appreciate that link data 432 requires much less data (bytes of electronic information/memory) than check image 300. Therefore, sending link data 432 (rather than data for the complete check image 300) requires less bandwidth and results in reduced electronic transmission costs.

Preferably, bank of deposit 204 transmits MICR-Link data 400 via an electronic data exchange 254 in the form of ACH debit 404 to ACH 216 (at least embodying processing such at least one electronic debit in such banking system to clear such at least one check, without substantial further processing of such at least one image or such at least one check and such associated at least one reference location information), as indicated by step 510. Preferably, electronic data exchange 254 comprises at least one information network, preferably at least one computer network. Preferably, electronic data exchange 254 comprises the Internet. Preferably, according to an alternate preferred embodiment of the present invention, electronic data exchange 254 comprises at least one intranet, preferably at least one banking system intranet. Preferably, ACH 216 transmits ACH debit 404 to paying bank 216, as indicated by step 512. Preferably, if paying bank 216 desires confirmation regarding ACH debit 404, then paying bank 216 can use link 226 to access check image 300 from database 250, as indicated by step 514. Preferably, ACH 208 facilitates the transfer of funds 220 to complete the check clearing process, as shown in FIG. 3 and as indicated by step 516. Preferably, transfer of funds 220 is accomplished via electronic debit.

Preferably, paying bank 216 provides bank statement 120 to customer 150 which includes link 226' which allows customer 150 to access check image 300 from database 250 (at least embodying herein such at least one bank statement is associated with such at least one reference locator).

Preferably, truncating banks (bank of deposit 204 for the embodiment shown in FIG. 3) provide guarantees that check image 300 in database 250 is accessible. Preferably, paying bank 216 agrees to accept truncation from any truncating bank. Although "Check 21" law currently requires that banks accept substitute checks, banks are not currently required to accept electronic check images or MICR line data. Therefore, unless the law changes, participation by banks and other financial institutions in many of the embodiments of the present invention will be voluntary. Given the numerous and significant benefits of the present invention, there is substantial motivation for banks and other financial institutions to participate voluntarily. Preferably ACH 208 provides a directory of banks indicating which banks participate and agree to accept truncated check transactions (and are willing to accept electronic debits using MICR line data coupled with links for accessing check image 300).

Upon reading the teachings of this specification, those with ordinary skill in the art will now appreciate that check clearing process 100 (at least embodying a banking system, relating to efficiently processing a plurality of checks issued by an assortment of banking customers) can provide many benefits over previous check clearing processes such as reduced float through the relatively fast ACH, reduction in collection fees, faster receipt of returns which reduces risk, better audit trails on returns for late return disputes, no MICR line parsing required, reduction in inclearings processing expense, and potential reduction in Federal payor bank service expense. Further, upon reading the teachings of this specification, those with ordinary skill in the art will now appreciate that check clearing process 100 could easily integrate into the existing ACH transaction processes, allow for a more automated process of exception item returns, and reduce return item collection expense.

Figure 6:
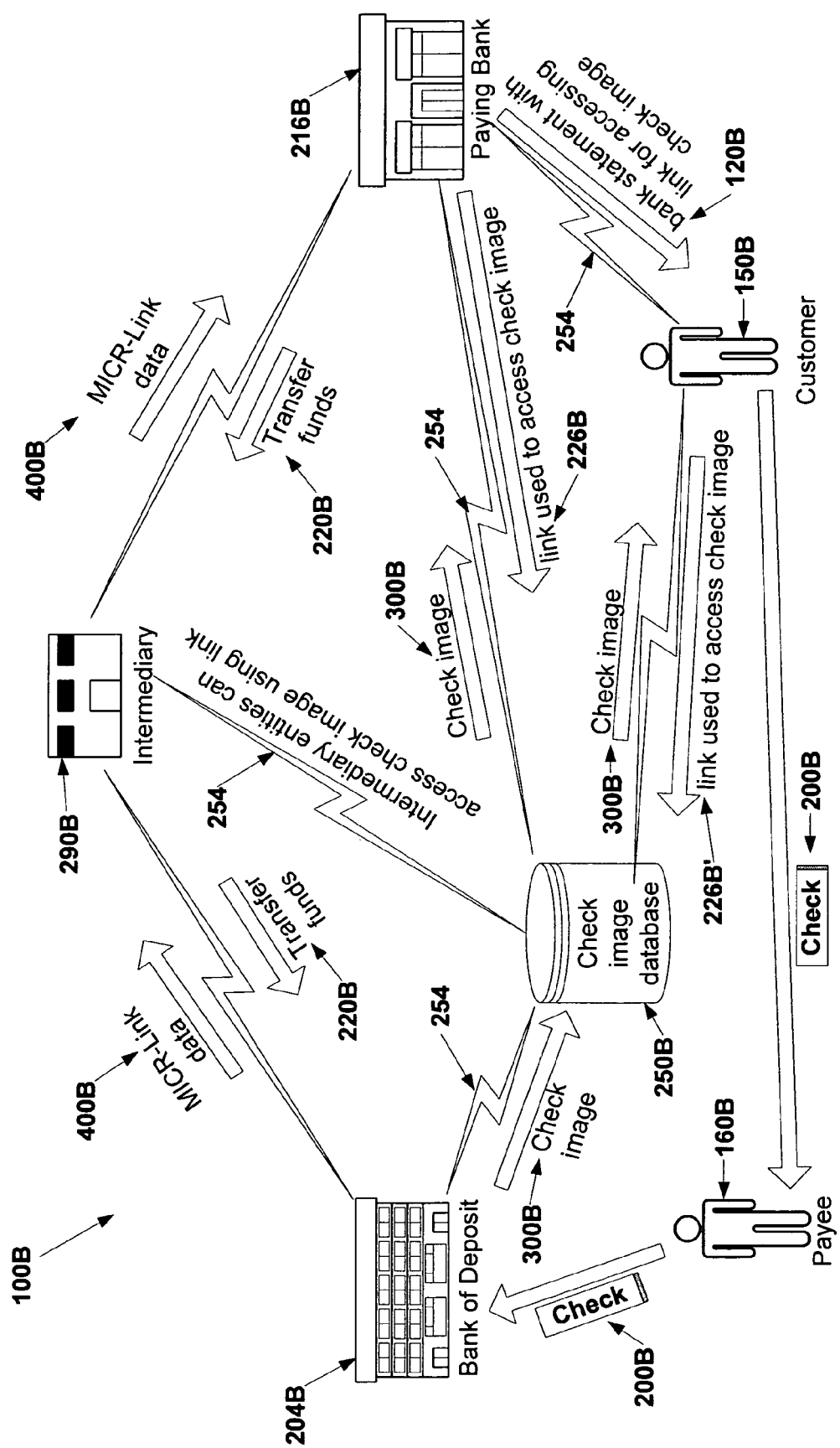
FIG. 6 shows a simplified functional diagram of a preferred embodiment of the present invention, showing the use of MICR-Link data to clear checks through an intermediary.

FIG. 6 shows a simplified functional diagram of check clearing process 100B in which MICR-Link data 400B is used to clear checks 200B through intermediary 210B. Preferably, customer 150B writes check 200B drawn against an account at paying bank 216B. Preferably, customer 150B presents check 200B to payee 160B, as shown. Preferably, payee 160B deposits check 200B in bank of deposit 204B. Preferably, bank of deposit 204B scans check 200B to obtain MICR line data 408, and check image 300B. Preferably, check image 300B is stored electronically in database 250B. Preferably, link data 432 is added to MICR line data 408 to create MICR-Link data 400B. Preferably, bank of deposit 204B transmits MICR-Link data 400 via an electronic data exchange 254 to intermediary 210B. Preferably, intermediary 210B comprises an electronic debit clearing entity. Upon reading the teachings of this specification, those with ordinary skill in the art will now understand that, under appropriate circumstances, considering such issues as available providers, banking regulations and laws, etc., other arrangements, such as intermediary comprising a bank, check clearing entity, Federal Reserve or other government entity, other financial institution, or other service provider, etc., may suffice. Preferably, intermediary 210B transmits MICR-Link data 400B to paying bank 216B. Preferably, if paying bank 216B desires confirmation then paying bank 216B can use link 226B to access check image 300B from database 250B. Preferably, intermediary 210B facilitates the transfer of funds 220B to complete the check clearing process, as shown. Preferably, paying bank 216B provides bank statement 120B to customer 150B which includes link 226B' which allows customer 150B to access check image 300B from database 250B.

Figure 7:
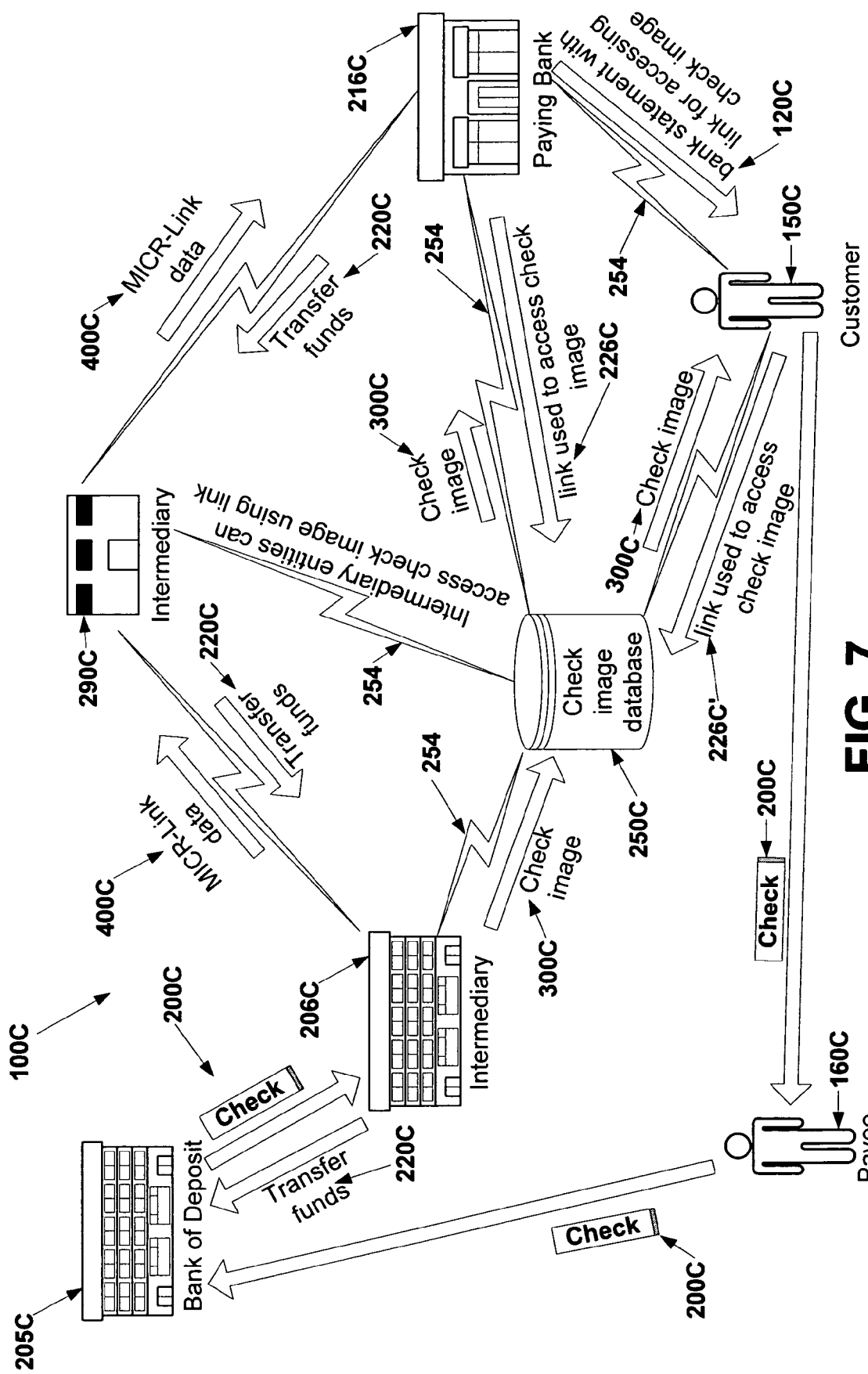
FIG. 7 shows a simplified functional diagram of a preferred embodiment of the present invention, showing a bank of deposit using an intermediary which then uses MICR-Link data to clear checks.

Upon reading the teachings of this specification, those with ordinary skill in the art will now appreciate that for some banks of deposit (such as, for example, very small banks) it may be more practical and efficient to contract with an outside entity (intermediary) to scan checks and maintain a database of check images. FIG. 7 shows an alternate preferred embodiment of the present invention. Preferably, as shown in check clearing process 100C, customer 150C writes check 200C drawn against an account at paying bank 216C. Preferably, customer 150C presents check 200C to payee 160C, as shown. Preferably, payee 160C deposits check 200C in bank of deposit 204C. Preferably, bank of deposit 205C forwards check 200C to intermediary 206C. Preferably intermediary 206C scans check 200C to obtain MICR line data 408, and check image 300C. Preferably, check image 300C is stored electronically in database 250C. Preferably, link data 432 is added to MICR line data 408 to create MICR-Link data 400C. Preferably, intermediary 206C transmits MICR-Link data 400 via an electronic data exchange 254 to intermediary 210C. Preferably, intermediary 210C comprises an electronic debit clearing entity. Upon reading the teachings of this specification, those with ordinary skill in the art will now understand that, under appropriate circumstances, considering such issues as available providers, banking regulations and laws, etc., other arrangements, such as intermediary comprising a bank, check clearing entity, other financial institution, or other service provider, etc., may suffice. Preferably, intermediary 210C transmits MICR-Link data 400C to paying bank 216C. Preferably, if paying bank 216C desires confirmation then paying bank 216C can use link 226C to access check image 300C from database 250C. Preferably, intermediary 210C facilitates the transfer of funds 220C to complete the check clearing process, all as shown. Preferably, paying bank 216C provides bank statement 120C to customer 150C which includes link 226C' which allows customer 150C to access check image 300C from database 250C.

Figure 8:
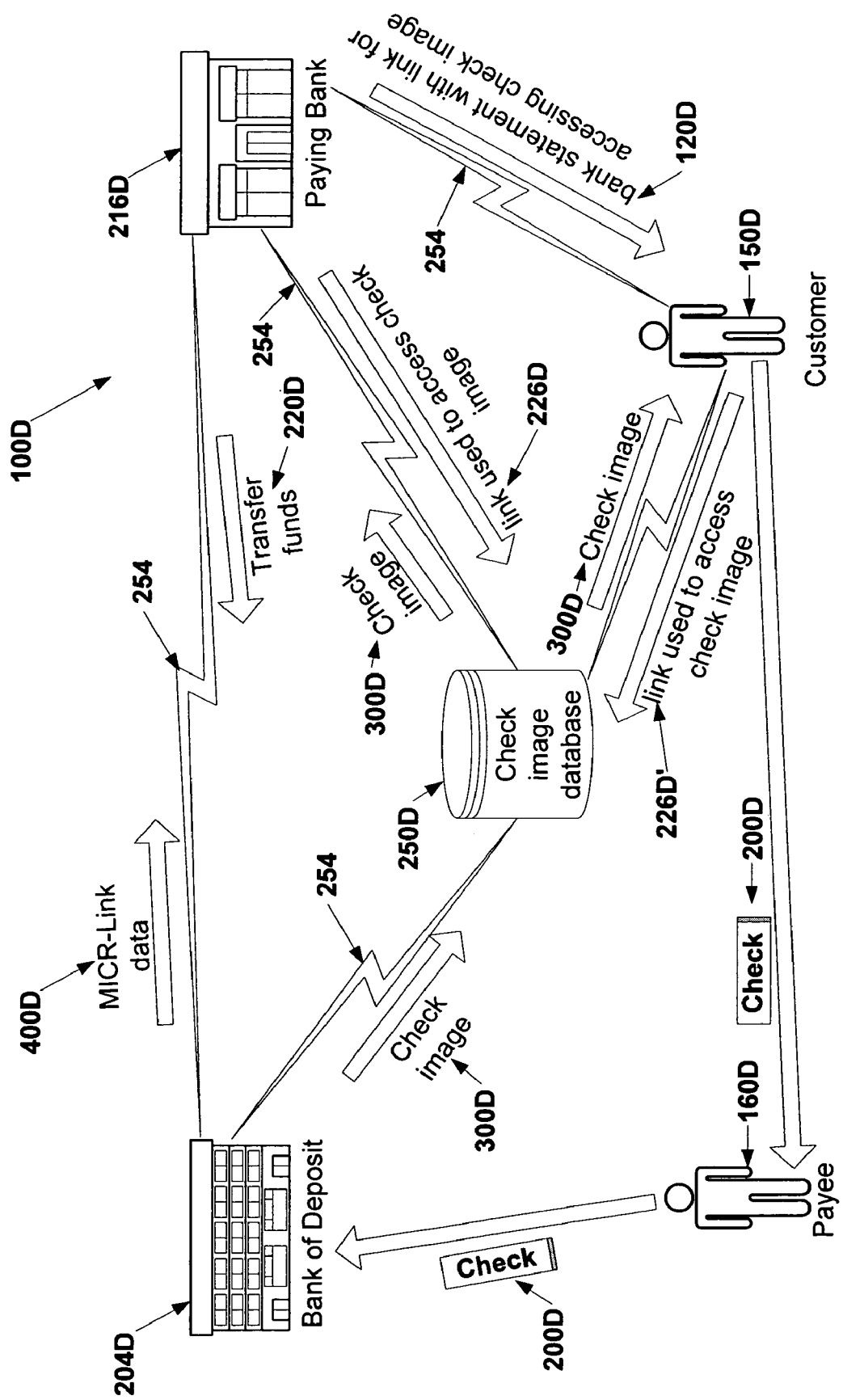
FIG. 8 shows a simplified functional diagram of a preferred embodiment of the present invention, showing the use of MICR-Link data to clear checks directly with a paying bank.

Upon reading the teachings of this specification, those with ordinary skill in the art will now appreciate that it may be more practical and efficient for a bank of deposit to clear checks directly with a paying bank. FIG. 8 shows an alternate preferred embodiment of the present invention. Preferably, as shown in check clearing process 100D, customer 150D writes check 200D drawn against an account at paying bank 216D. Preferably, customer 150D presents check 200D to payee 160D, as shown. Preferably, payee 160D deposits check 200D in bank of deposit 204D. Preferably, bank of deposit 204D scans check 200D to obtain MICR line data 408, and check image 300D. Preferably, check image 300D is stored electronically in database 250D. Preferably, link data 432 is added to MICR line data 408 to create MICR-Link data 400D. Preferably, bank of deposit 204D transmits MICR-Link data 400 via an electronic data exchange 254 to paying bank 216D. Preferably, if paying bank 216D desires confirmation then paying bank 216D can use link 226D to access check image 300D from database 250D. Preferably, paying bank 216D transfers funds 220D to complete the check clearing process, as shown. Preferably, paying bank 216D provides bank statement 120D to customer 150D which includes link 226D' which allows customer 150D to access check image 300D from database 250D.

Figure 9:
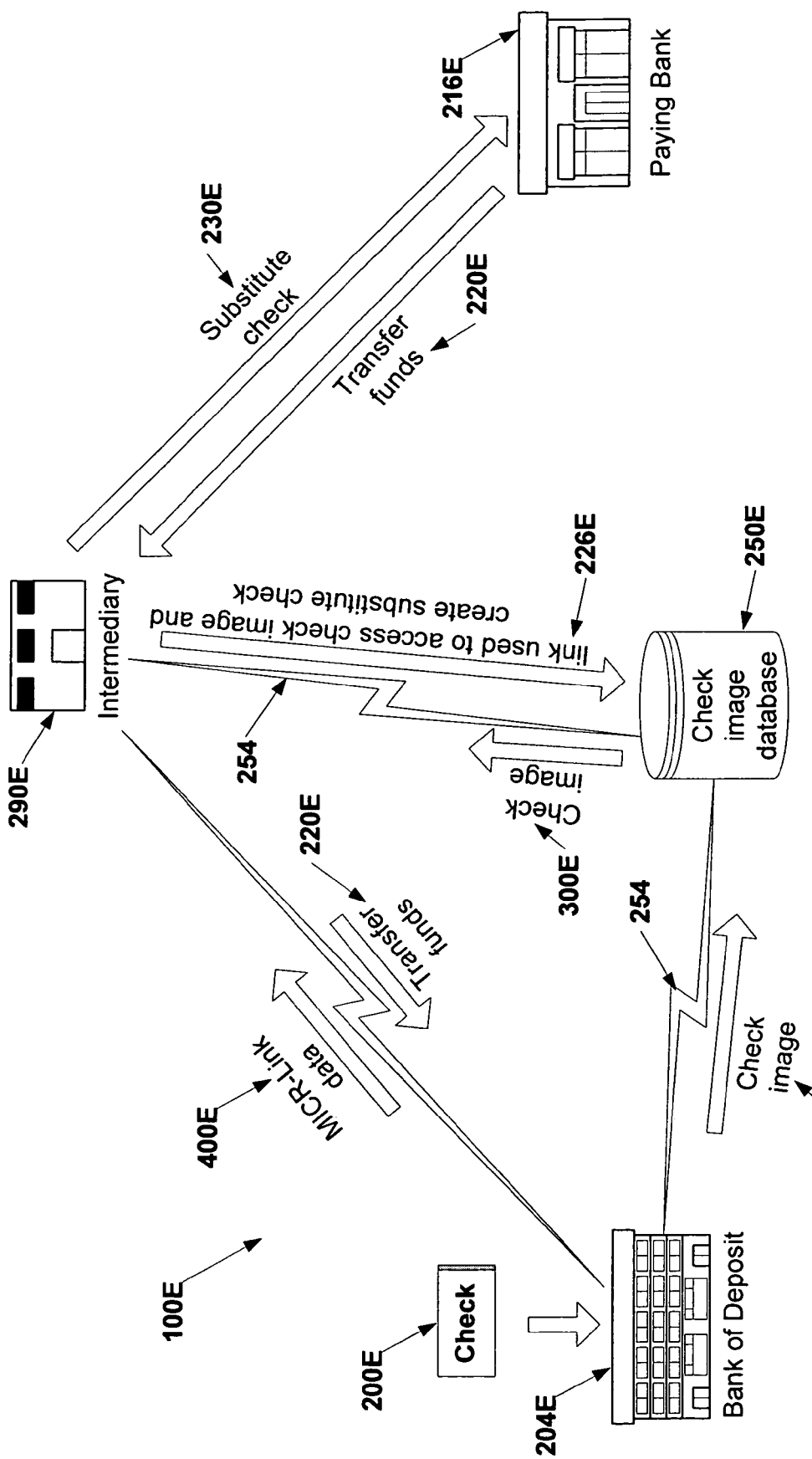
FIG. 9 shows a simplified functional diagram of a preferred embodiment of the present invention, showing an intermediary using MICR-Link data to print an IRD for presentment.

Upon reading the teachings of this specification, those with ordinary skill in the art will now appreciate that some paying banks may not wish to clear checks without receiving an original physical check or substitute check. FIG. 9 shows an alternate preferred embodiment of the present invention. Preferably, as shown in check clearing process 100E, check 200E is deposited at bank of deposit 204E. Preferably, bank of deposit 204E scans check 200E to obtain MICR line data 408, and check image 300E. Preferably, check image 300E is stored electronically in database 250E. Preferably, link data 432 is added to MICR line data 408 to create MICR-Link data 400E. Preferably, bank of deposit 204E transmits MICR-Link data 400 via an electronic data exchange 254 to intermediary 210E. Preferably, intermediary 210E, functions in the capacity of a reconverting bank, using link 226E to access check image 300E from database 250E in order to create substitute check 230E. Preferably intermediary 210E forwards substitute check 230E to paying bank 216E. Preferably, intermediary 210E facilitates the transfer of funds 220E to complete the check clearing process, as shown.

Figure 10:
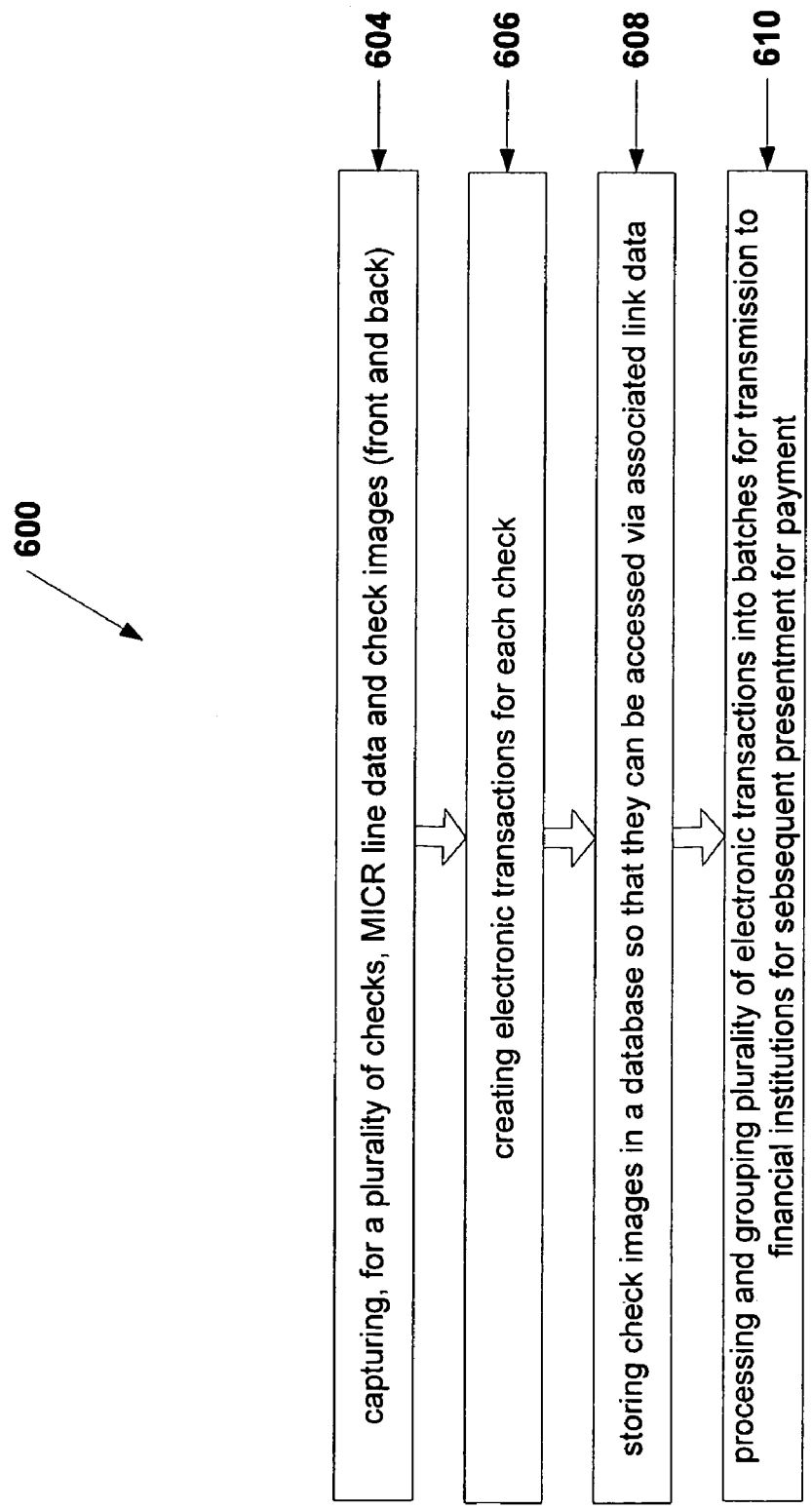
FIG. 10 shows a flow diagram of steps of a program involved in converting checks according to a preferred embodiment of the present invention.

Preferred embodiments to facilitate computer systems for assisting in practicing this invention will now be described. Preferably, as best shown in FIG. 10, computer program 600 facilitates the steps of clearing a plurality of checks by capturing MICR line data 408 and check image 300 for each check 200 (as indicated by step 604), creating an electronic transaction (which preferably comprises information pertaining to the depositor or payee of the original check) from MICR line data 408 and link data 432 for each check 200 (as indicated by step 606), storing check image 300 in database 250 so that it can be accessed via link data 432 (as indicated by step 608), and processing the plurality of electronic transactions into batches or files of entries for transmission to financial institutions for subsequent presentment for payment (as indicated by step 610).

Figure 11:
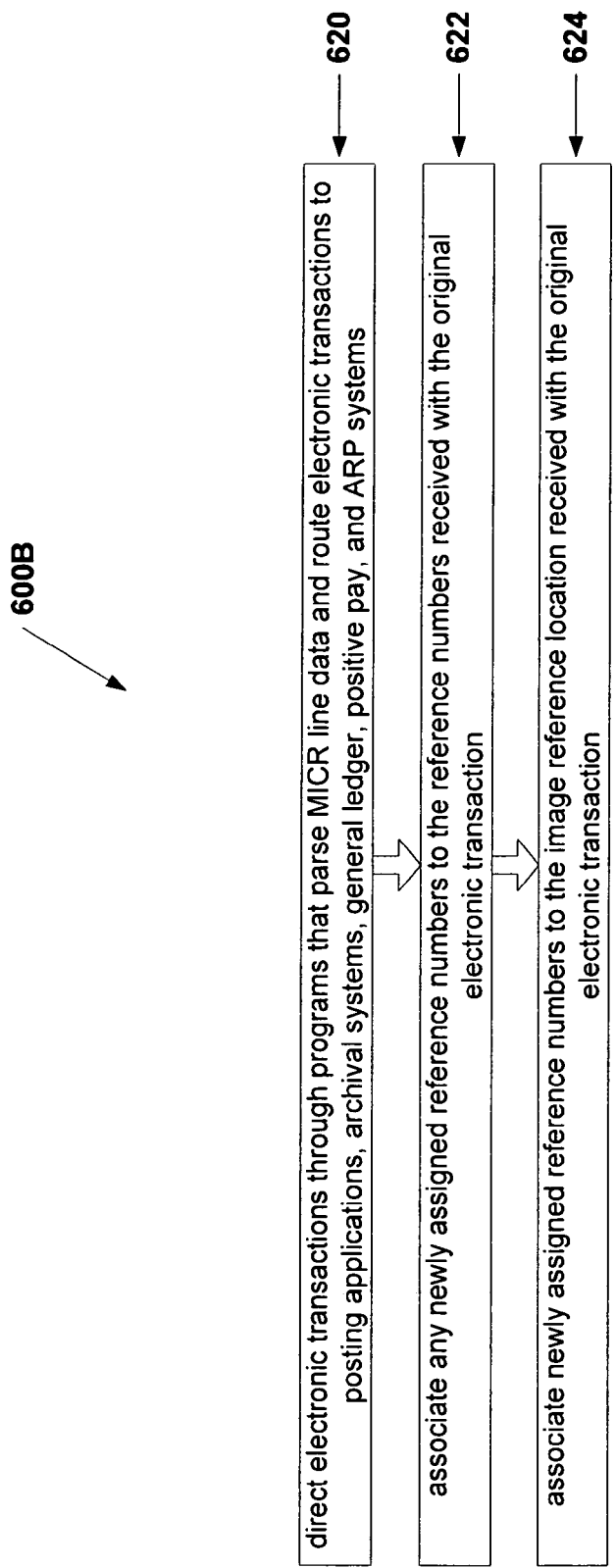
FIG. 11 shows a flow diagram of steps of a program involved in routing electronic transactions according to a preferred embodiment of the present invention.

Preferably, as best shown in FIG. 11, computer program 600B facilitates the steps of directing electronic transactions through programs that parse MICR line data 408 and route electronic transactions to posting applications, archival systems, general ledger, positive pay, and ARP systems (as indicated by step 620). Preferably, computer program 600B is adapted to integrate with existing programs and applications for posting applications, archival systems, general ledger, positive pay, and ARP systems. Preferably, computer program 600B assists to associate any newly assigned reference numbers to the reference numbers received with the original electronic transaction (as indicated by step 622) and assists to associate newly assigned reference numbers to the image reference location received with the original electronic transaction (as indicated by step 624).

Figure 12:
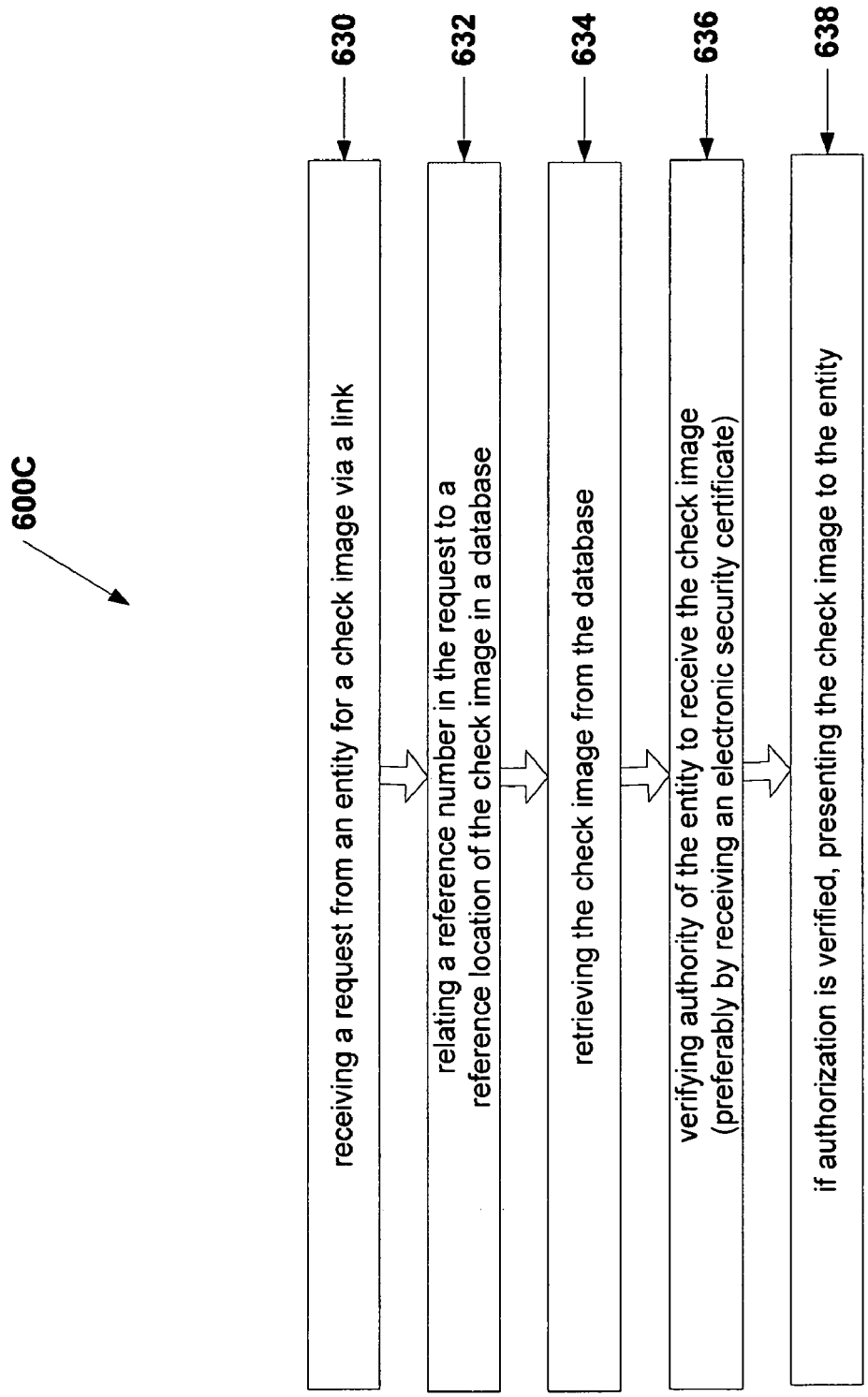
FIG. 12 shows a flow diagram of steps of a program involved in retrieving check images from a database according to a preferred embodiment of the present invention.

Preferably, as best shown in FIG. 12, computer program 600C facilitates the steps of receiving a request for check image 300 via link 226 (as indicated by step 630), relating a reference number in the request to a reference location of check image 300 in database 250 (as indicated by step 632), retrieving check image 300 from database 250 (as indicated by step 634), verifying authority to receive check image 300, preferably by receiving an electronic security certificate (as indicated by step 636), and if authorization is verified, presenting check image 300 to the entity making the request (as indicated by step 638).

Thus, it will be seen that this invention embodies (according to FIGS. 10, 11, and 12 and specification relating thereto) and provides, according to a preferred embodiment of the present invention, a computer program facilitating efficient processing of a plurality of checks issued by an assortment of banking customers, comprising the steps of: assisting to preserve, as at least one part of at least one information network accessible by computer use, at least one image of each at least one check of such plurality of checks; assisting to provide banking information associated with each such at least one check in at least one form of at least one electronic debit usable for banking purposes independently of such at least one image or such at least one check; assisting to associate with such at least one electronic debit at least one reference location information sufficient to locate and retrieve from such at least one information network at least one copy of such at least one image; and assisting to process in such banking system to clear such at least one check, without processing such at least one image or such at least one check, such at least one electronic debit and such associated at least one reference location information.

It also embodies and provides such a program wherein computer program steps relating to creating such at least one electronic debit and preparing such at least one electronic debit relating to batch transmission comprise: driving at least one scanning device to capture at least one MICR line from such at least one check, at least one image of at least one front of such at least one check, and at least one image of at least one back of such at least one check; creating at least one such electronic debit from data from such at least one MICR line, such at least one electronic debit incorporating information pertaining to at least one depositor of such at least one check and such at least one reference location information; storing such at least one image so that such at least one reference location information is sufficient to locate and retrieve from such at least one information network such at least one copy of such at least one image; and gathering such at least one electronic debits into batches relating to such processing to do such clearing.

And this invention embodies and provides such a program wherein computer program steps relating to receiving and processing such at least one electronic debit comprise: directing such batches of such at least one electronic debits to at least one banking system existing programs parsing MICR lines and routing transactions to at least one of posting applications, archival systems, general ledger, positive pay, ARP systems; assisting to associate any at least one first newly-assigned reference number to at least one original reference number received with the at least one electronic debit; and assisting to associate any at least one second newly-assigned reference number with such at least one reference location information.

And this invention embodies and provides such a program wherein computer program steps relating to securing the viewing of such at least one check image comprise: receiving at least one request for at least one image of such at least one check from at least one source authorized by such banking system; relating at least one request reference number to such at least one reference location information; providing at least one image archive source with at least one security information; retrieving such at least one image through web connection using such at least one reference location information; and presenting such at least one image in response to such at least one request.

Although applicant has described applicant's preferred embodiments of this invention, it will be understood that the broadest scope of this invention includes modifications such as diverse shapes, sizes, and materials. Such scope is limited only by the below claims as read in connection with the above specification.

Further, many other advantages of applicant's invention will be apparent to those skilled in the art from the above descriptions and the below claims.

What is claimed is:

1. A method, relating to efficiently processing a plurality of checks issued by an assortment of banking customers, comprising the steps of:

preserving, as at least one part of at least one computer information network accessible by computer use, at least one image of each at least one check of the plurality of checks;

associating, by at least one first computer processor, at least one reference location information with banking information associated with the at least one check, the at least one reference location information being sufficient to locate and retrieve from the at least one computer information network at least one copy of the at least one image of the at least one check;

transmitting, by at least one second computer processor, the at least one reference location information and the banking information in at least one form of at least one electronic debit usable for banking purposes independently of the at least one image or the at least one check; and processing, by at least one third computer processor, the at least one electronic debit to clear the at least one check, without further processing of the at least one image or the at least one check, and without further processing of the associated at least one reference location information.

2. The method according to claim 1 wherein the banking information comprises Magnetic Ink Character Recognition ("MICR") line information.

3. The method according to claim 2 wherein the at least one reference location information is appended to the MICR line information.

4. The method according to claim 3 wherein the at least one reference location information comprises at least one Uniform Resource Locator ("URL").

5. The method according to claim 1 wherein the at least one reference location information comprises hyperlink information.

6. The method according to claim 5 wherein the hyperlink information comprises at least one Uniform Resource Locator ("URL").

7. The method according to claim 1 wherein the at least one computer information network comprises the Internet.

8. The method according to claim 1 wherein the at least one computer information network comprises at least one intranet.

9. The method according to claim 8 wherein the at least one intranet comprises a banking-system intranet.

10. The method according to claim 1 further comprising the steps of:

rendering, by at least one computer, at least one bank statement to at least one banking customer;

wherein the at least one bank statement is associated with the at least one reference location information.

11. The method according to claim 4 further comprising the steps of:

rendering, by at least one computer, at least one bank statement to the at least one banking customer;

wherein the at least one bank statement is associated with the at least one reference location information.

12. A method for a banking system, relating to such banking system providing efficient processing of a plurality of bank-deposited checks issued by an assortment of banking customers, comprising the steps of:

collecting of a plurality of bank-deposited checks;

preserving, by at least one first computer processor, as at least one part of at least one computer information network accessible by computer use, at least one image of each at least one check of the plurality of bank-deposited checks;

preserving, by at least one second computer processor, banking information associated with each at least one bank-deposited check in at least one form of at least one electronic debit usable for banking purposes independently of the at least one image or the at least one bank-deposited check;

associating, by at least one third computer processor, at least one reference location information with the at least one electronic debit on the at least one computer information network, the at least one reference location being sufficient to locate and retrieve from the at least one computer information network at least one copy of the at least one image; and generating, in connection with each bank-deposited check, by at least one fourth computer processor, the at least one electronic debit, including the at least one associated reference location information, for use as the primary regular transmission among agreeing parties to process and clear the plurality of bank-deposited checks, without further processing of the at least one image or the at least one check.

13. The method according to claim 12 wherein the banking information comprises Magnetic Ink Character Recognition ("MICR") line information.

14. The method according to claim 13 wherein the at least one reference location information is appended to the MICR line information.

15. The method according to claim 14 wherein the at least one reference location information comprises at least one Uniform Resource Locator ("URL").

16. The method according to claim 12 wherein the at least one reference location information comprises hyperlink information.

17. The method according to claim 16 wherein the hyperlink information comprises at least one Uniform Resource Locator ("URL").

18. The method according to claim 12 wherein the at least one computer information network comprises the Internet.

19. The method according to claim 12 wherein the at least one computer information network comprises at least one intranet.

20. The method according to claim 19 wherein the at least one intranet comprises a banking-system intranet.

21. The method according to claim 12 further comprising the steps of:
rendering, by at least one computer, at least one bank statement to at least one banking customer;
wherein the at least one bank statement is associated with the at least one reference location information.

22. The method according to claim 15 further comprising the steps of:
rendering, by at least one computer, at least one bank statement to at least one banking customer;
wherein the at least one bank statement is associated with the at least one reference location information.

23. A computer method, relating to efficiently processing a plurality of checks issued by an assortment of banking customers, comprising, in combination, the steps of:
preserving, as at least one part of at least one computer information network accessible by computer use, at least one image of each at least one check of the plurality of checks;
associating, by at least one first computer processor, at least one reference location information with banking information associated with the at least one check, the at least one reference location information being sufficient to locate and retrieve from the at least one computer information network at least one copy of the at least one image;
transmitting, by at least one second computer processor, the at least one reference location information and the banking information in at least one form of at least one electronic debit usable for banking purposes independently of the at least one image or the at least one check; and
processing, by at least one third computer processor, in a banking system to clear the at least one check, the at least one electronic debit and the associated at least one reference location information without processing the at least one image or the at least one check.

24. The computer method according to claim 23 wherein steps relating to creating the at least one electronic debit and preparing the at least one electronic debit relating to batch transmission comprise:
utilizing, by at least one computer, at least one computerized scanning device to capture
at least one Magnetic Ink Character Recognition ("MICR") line from the at least one check,
at least one image of at least one front of the at least one check; and
at least one image of at least one back of the at least one check;
creating, by at least one computer, at least one electronic debit from data from the at least one MICR line, the at least one electronic debit incorporating information pertaining to
at least one depositor of the at least one check, and
the at least one reference location information;
storing, on the at least one computer information network, the at least one image so that the at least one reference location information is sufficient to locate and retrieve from the at least one computer information network the at least one copy of the at least one image; and
gathering, by at least one computer, the at least one electronic debits into batches relating to processing to do clearing.

25. The computer method according to claim 24 wherein steps relating to receiving and processing such at least one electronic debit comprise:
directing, by at least one computer, the batches of the at least one electronic debits to at least one banking system existing programs parsing MICR lines and routing transactions to at least one of
posting applications,
archival systems,
general ledger,
positive pay, or
Account Reconciliation Package ("ARP") systems;
associating, by at least one computer, any at least one first newly-assigned reference number to at least one original reference number received with the at least one electronic debit;
associating, by at least one computer, any at least one second newly-assigned reference number with the at least one reference location information.

26. The computer method according to claim 23 wherein steps relating to securing the viewing of the at least one check image comprise:
receiving, by at least one computer, at least one request for at least one image of the at least one check from at least one source authorized by the banking system;

relating, by at least one computer, at least one request reference number to the at least one reference location information;

providing at least one image archive source with at least one security information on at least one computer information network;

retrieving, from the at least one computer information network, the at least one image through web connection using the at least one reference location information; and presenting, by at least one computer, the at least one image in response to the at least one request.

27. A computer banking system, relating to efficiently processing a plurality of checks issued by an assortment of banking customers, comprising, in combination:

a) at least one first computer processor adapted to preserve, as at least one part of at least one computer information network accessible by computer use, at least one image of each at least one check of the plurality of checks;

b) at least one second computer processor adapted to associate at least one reference location information with banking information associated with the at least one check, the at least one reference location information being sufficient to locate and retrieve from the at least one computer information network at least one copy of the at least one image;

c) at least one third computer processor adapted to transmit the at least one reference location information and the banking information-in at least one form of at least one electronic debit usable for banking purposes independently of the at least one image or the at least one check; and d) at least one fourth computer processor adapted to process the at least one electronic debit and the associated at least one reference location information to clear the at least one check, without processing the at least one image or the at least one check.

\* \* \* \* \*